United States Patent
Verbeke, Jr. et al.

[11] Patent Number: 5,220,329
[45] Date of Patent: Jun. 15, 1993

[54] MONOPULSE REPLY EXTRACTOR FOR SSR NAVIGATION SYSTEMS

[75] Inventors: Charles E. Verbeke, Jr., Huntington Station; Robert H. Stein, Merrick, both of N.Y.

[73] Assignee: Cardion, Inc., Woodbury, N.Y.

[21] Appl. No.: 738,045

[22] Filed: Jul. 30, 1991

[51] Int. Cl.$^5$ .................. G01S 13/76; G01S 13/80
[52] U.S. Cl. .................. 342/40; 342/159
[58] Field of Search .................. 342/40, 39, 32, 37, 342/159

[56] References Cited

U.S. PATENT DOCUMENTS

| | | | |
|---|---|---|---|
| 3,732,563 | 5/1973 | Nelson | 342/40 |
| 3,900,846 | 8/1975 | Gibbon et al. | 342/37 |
| 4,167,006 | 9/1979 | Funatsu et al. | 342/32 |
| 4,314,247 | 2/1982 | Elberink et al. | 342/40 |
| 4,361,202 | 11/1982 | Minovitch | 342/71 X |
| 4,533,871 | 8/1985 | Boetzkes | 342/46 X |
| 4,630,048 | 12/1986 | Callahan, Jr. | 342/45 |
| 4,630,049 | 12/1986 | Callahan, Jr. | 342/45 |
| 4,642,638 | 2/1987 | Callahan, Jr. | 342/45 |
| 4,761,651 | 8/1988 | Matsunaga | 342/40 |
| 4,789,865 | 12/1988 | Litchford | 342/455 |
| 4,899,157 | 2/1990 | Sanford et al. | 342/40 |
| 4,945,550 | 7/1990 | Krause et al. | 342/40 X |
| 4,952,928 | 8/1990 | Carroll et al. | 340/825.54 |
| 5,077,673 | 12/1991 | Brodegard et al. | 364/461 |

Primary Examiner—John B. Sotomayor
Attorney, Agent, or Firm—Pollock, Vande Sande & Priddy

[57] ABSTRACT

An SSR reply decoding system for separating pulse codes of a series of closely-spaced or overlapping SSR replies is disclosed. A delay line is connected to receive pulses representing the leading edge of each SSR reply code pulse. The delay line has a length corresponding to at least two bracket lengths of an SSR reply. A bracket decoder is connected to respective taps of the delay line for determining the beginning and end of a first SSR reply. A phantom reply detector is connected to the remaining taps for inhibiting the bracket decoder when two replies are represented by pulses in the delay lines, one of the replies having a pulse space from the pulse of another reply equal to a framing pulse period for an SSR reply. The phantom reply detector therefore inhibits the detection of phantom replies. As a discriminate for determining when pulses having the spacing of a framing period belong to different replies, azimuth data is provided which will permit discrimination of these phantom conditions.

17 Claims, 8 Drawing Sheets

FIG.1(a)
FIG.1(b)
FIG.1(c) PHANTOM F1 / PHANTOM F2
FIG.1(d) TRUE BRACKET DECODES
FIG.1(e) PHANTOM BRACKET DECODES

FIG.2(a) F1 C1 A1 C2 A2 C4 A4 X B1 D1 B2 B4 D4 F2    SPI (SOMETIMES CALLED I/P)    POSITION IDENTIFIER REFERENCE

FIG.2(b) F1  C2 A2 C4 A4   F2    ABCD 6060  TARGET 1

FIG.2(c)    F1 C1 C2 A1 C2 A2 A2 C4 A4    B1 D1 B2 D2 F2    3333  TARGET 2

FIG.2(d) F1  C2 A2 C4 A4   D1 B2 D2 B4 D4 F2  7777 SPI F2' F2' F2'   7777   COMPOSITE 1&2

FIG.2(e)                   BRACKET DECODE TARGET 1         BRACKET DECODE TARGET 2    TRUE BKT DECODES

FIG.2(f)                                                                               FALSE (PHANTOM) BRACKET DECODES FROM TARGET 1&2 GARBLE

MONOPULSE REPLY EXTRACTOR FOR SSR NAVIGATION SYSTEMS

The present invention relates to processing and decoding of multiple replies issued from secondary surveillance radar (SSR) navigation transponders. Specifically, the present invention provides an apparatus and method for processing and decoding both closely-spaced and garbled replies without a loss of data from either reply.

SSR navigation systems employ a system for interrogating aircraft from the ground, which have transponders for transmitting a pulse stream identifying the identity and altitude of an aircraft. The replies from an interrogation comprise a pulse train of pulses encoding the identity and/or altitude of an aircraft being interrogated. The pulse stream is framed by two framing pulses generally identified as F1 and F2, marking the beginning and end of a reply.

In locations such as airports, there is always a continuous source of replies being emitted by various aircraft. Indeed, any attempt to receive a reply in response to an interrogation from the ground may also receive fruit, consisting of SSR transponder replies from aircraft other than the one or ones of interest.

In processing such replies, it is possible to have either two very closely spaced replies, or the replies may be garbled as two or more replies from different aircraft overlap, making it difficult to distinguish which pulses belong to which reply. A problem associated with multiple replies, including fruit, is that phantom replies may be generated. The framing pulses F1 and F2 generally identify the beginning and end of a reply stream and are spaced 20.3 microseconds apart. Pairs of closely-spaced replies, although not overlapping, may include data pulses which also have the required 20.3 microseconds spacing, thus falsely identifying a bracket of a reply. These phantom brackets would incorrectly identify a reply for the reply processor to process. Obviously, pulses which lie between the phantom brackets are a function of multiple replies and would be incorrectly decoded as a true reply.

This situation also occurs in the case of garbled replies. The two overlapping replies may have pulses which are spaced 20.3 microseconds apart, belonging to different replies, which will be detected as framing pulses of a phantom bracket containing pulses belonging to a phantom reply. Decoding of these phantom replies also produces a phantom target.

It is known in the prior art to avoid the decoding of phantom replies produced from a garble. Limited processing is employed, which results in the loss of code data by disregarding all the pulses which appear to be contained in overlapping replies constituting the garble. This procedure discards valuable information regarding the replies, reducing the effectiveness of the air traffic control system.

SUMMARY OF THE INVENTION

It is an object of this invention to avoid decoding of phantom replies and effect complete code recovery in an SSR reply processor/decoder.

It is a more specific object of this invention to provide discrimination between adjacent closely-spaced replies and overlapping, garbling replies using high resolution pulse positioning and azimuth position data as discriminants.

These and other objects of the invention are provided for by a reply processor/decoder which suppresses the generation of a bracket decode when two pulses belonging to different replies have the same spacing in time equal to two framing pulses of a standard SSR reply. Individual code content of a reply is extracted using high resolution pulse positioning and azimuth position data as discriminates.

In the process of suppressing phantom replies, the serial replies received by the SSR reply processor are first quantized, such that the leading edge of each received pulse is marked by a leading edge pulse of a standard width. The series of leading edge pulses generated in response to each pulse contained in the replies is passed through a delay line having a delay of greater than two reply bracket periods.

The delay line permits the detection of various pulses in the stream of replies being received by the reply processor. When two pulses having the appropriate spacing (including tolerances of the framing pulses F1 and F2) are detected, a bracket decode is produced.

Recognizing that phantom bracket decodes occur, i.e., pulses having the correct spacing but belonging to different replies, a phantom reply detector is employed to make decisions as to whether or not the bracket pair is a correct decode identifying framing pulses of the same reply or a phantom reply.

The phantom reply detector employs spatial position data for each pulse represented by the leading edge pulse being propagated through the delay line. An off-bore sight azimuth (OBA) channel provides this position data for each pulse. A reference OBA is obtained for the first reply, detected when the first bracket decode occurs. As the leading F1 pulse of the first bracket decode would be uncorrupted in a garble reply condition, the direction of this pulse represented by the off-bore sight azimuth data through the OBA channel may be used as a discriminant for each subsequently produced pulse following the first F1 framing pulse to determine whether or not the subsequent pulse belongs to the same reply as the first framing pulse. Conversely, the F2 framing pulse of the second reply would be uncorrupted and may be used as a discriminate for pulses residing between the second set of framing pulses.

The phantom reply detector synchronously detects each subsequent pulse position with reference to the presence of the first detected framing pulse. Using the delay line as a look-ahead device, a second potential bracket decode is located when pulses in the delay line have the spacing of a second pair of framing pulses F1, F2. The synchronous pulse positions referenced to the F1 framing pulse are used along with OBA data as a discriminate to inhibit the bracket decoder when pulses having the spacing of a pair of framing pulses originate from different directions, indicating they belong to different replies.

Additional to the directional discriminate provided by the off-bore sight azimuth, the delay line has a length to include pulse positions which lie outside a bracket. Thus, the delay line can hold pulse trains having a length of at least two brackets, permitting the investigation of garbled replies, as well as closely-spaced replies. A state machine within the phantom detector can, by examining three taps on this delay line, determine when closely-spaced replies are present, as well as when garbled conditions exist within a train of pulses propagating through the delay line. The state machine using the look-ahead capability of the delay line cannot only identify the condition of a second closely-spaced reply or a second garbling reply, but can actually locate the beginning and end of each second reply.

In situations where the azimuth position information is ambiguous, a counter is provided within the phantom reply detector state machine to identify the probable location of the second bracket decode in a pair of garbled replies, permitting a default mode of operation under these ambiguous circumstances. Using two of the three garbled taps described above, the presence of two pulses separated by a bracket width is detected and causes an internal counter to be preset to 15. At each synchronous code position after that, the two garble taps described above are examined and when no occurrence of two framing pulses is detected, the counter is decremented. If the presence of two pulses separated by a bracket width is detected, the counter is again preset to 15. Once the first set of pulses separated by a bracket width have reached the bracket decode position on the delay line, the count reached is read out of the counter and stored as an indication of the relative position of the second bracket with respect to the first bracket which was decoded. This indication will then be used in the default condition to identify the beginning and end of the second overlapping reply bracket.

DESCRIPTION OF THE FIGURES

FIGS. 1a to 1e illustrate the condition wherein two closely-spaced replies have been received having data pulses which will produce phantom brackets and indicate the presence of phantom replies.

FIGS. 2a to 2f illustrate a pair of replies which produce a garbled condition as they synchronously overlap in time and have pulses which are spaced such that pulses of each reply produce phantom bracket decodes.

DESCRIPTION OF THE PREFERRED EMBODIMENT

Figure 3:
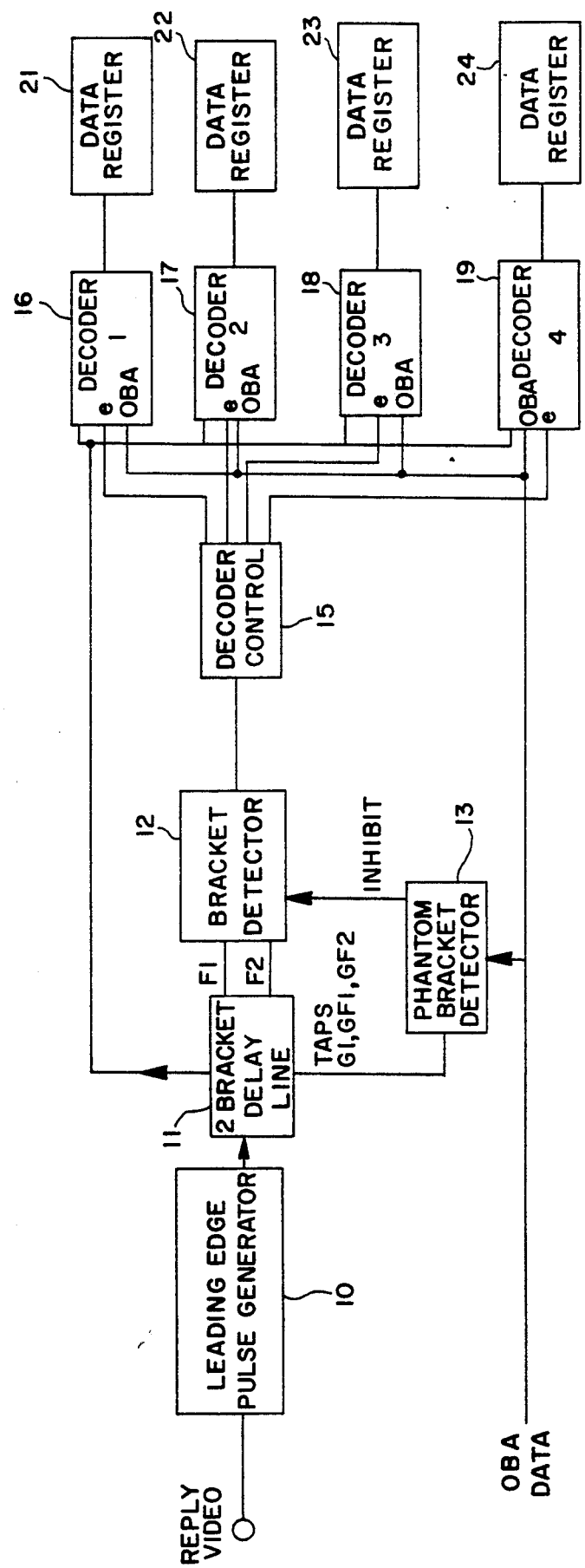
FIG. 3 is a block diagram illustrating a reply processor having phantom bracket detection and inhibit control.

The condition of phantom bracket generation can be observed in FIG. 1 wherein two closely-spaced replies are shown from a pair of SSR transponders. Each SSR transponder produces a reply bounded by first and second framing pulses F1 and F2, in the timing diagram of FIG. 1. The top sequence of pulses (a) of FIG. 1 illustrates the various pulse positions of two closely-spaced replies. The framing pulses correspond to pulses F1 and F2. Time-wise, the pulses to the right represent later-occurring events and pulses to the left represent earlier-occurring events.

The second line (b) of FIG. 1 illustrates two closely-spaced replies having respective framing pulses F1 and F2. The two replies each include pulses in positions C2, A2, C4, A4 and C1, A1, C2, A2, B1, D1, B2, D2, respectively. The required spacing of two framing pulses is present between pulse C2 of the first reply and pulse C1 of the second reply. Thus, a bracket decoder may well determine that these pulses represent framing pulses of a single reply, which clearly they do not. Pulse A2 of reply 1 and A1 of reply 2, C4 of reply 1 and C2 of reply 2 and A4 of reply 1 and A2 of reply 2 additionally have the required spacing of two framing pulses, thus also having the capability of indicating a phantom bracket, i.e., as shown in line (e), one which does not really exist but appears so because of the correct pulse spacing. Line (c) of FIG. 1 illustrates these phantom F1 and phantom F2 framing pulses and line (e) represents a phantom bracket decode which would result from the pulses in these closely-spaced replies. Line (d) represents the true bracket decode for each of the replies which corresponds to the F2 pulse for each reply.

A similar situation is observed with respect to FIG. 2, where two replies are overlapped, producing a garbled reply. Line (a) represents the pulse position of a standard reply. Line (b) of FIG. 2 illustrates the first reply target and line (c) represents a second garbling target reply. When the two replies are combined together, as shown in line (d) of FIG. 2, a situation occurs wherein pulses of each of the replies have a position corresponding to framing pulses of a reply. As shown in line (f) of FIG. 2, there is a false (phantom) bracket decode when two pulses of the garbled replies have the corresponding spacing of two framing pulses F1 and F2. The fifth trace, line (e), illustrates the true bracket decodes for each of the garbled replies.

The situations represented in FIGS. 1 and 2 occur on a reasonably frequent basis during the interrogation and analysis of replies from SSR transponders. The more crowded the area of interrogation, and the larger the number of interrogators in the area, i.e., near airports, the more likely these scenarios result, making it difficult to reliably detect and decode the replies to obtain the necessary air traffic information.

Without phantom elimination, the phantom brackets would initiate decoding by a subsequent decoder and the decoded phantom reply would have no meaning and confuse the air traffic monitoring process.

FIG. 3 is a block diagram showing an apparatus for detecting the presence of phantom brackets within a garbled or closely-spaced reply scenario, and enabling a decoder when a true bracket is detected. The reply video containing each of the demodulated pulse streams from an SSR transponder, issuing the reply in response to an interrogation containing fruit, is applied first to a leading edge generator 10. Each of the reply video pulses have a width of 450 nanoseconds ±100 ns, which is quantized into a leading edge pulse having a nominal width of 60 nanoseconds. The leading edge of the 60 nanosecond pulse produced by the leading edge generator 10 corresponds to the leading edge of each received video pulse of the SSR transponder reply. In the situation wherein pulses are overlapped and are larger than the maximum allowed pulse width for one SSR pulse, pulse width discrimination is used to insert one or two additional leading edges at appropriate positions.

The leading edge pulses are applied to a delay line device 11. The delay line device 11 will store a pulse stream of at least two bracket periods, and provide a look-ahead device to examine the contents of two closely-spaced replies, or two garbling replies. A bracket detector is connected to the delay line to identify the presence of two pulses 20.30 us apart (F1 and F2 framing pulses). At the same time the bracket detector examines the incoming leading edge pulses, a phantom bracket detector 13 is employed to determine whether or not pulses having the required framing pulse spacing are in fact true framing pulse F1 and F2, or merely pulses of two different replies having the framing pulse spacing. An inhibit signal is issued to the bracket detector 12 to prohibit it from identifying the presence of a bracket when it appears that a pulse, in the position of an F2 pulse, in fact belongs to a different reply.

A plurality of decoders 16 17, 18 and 19 are sequentially enabled after each true bracket decode detection is made by the bracket detector 12. A decoder control unit 15 will enable one of the decoders 16, 17, 18 and 19 to process all true brackets received by supplying a reply reference OBA into the decoders at the time of bracket decode. The decoder decodes the leading edge pulse data by noting the position within the brackets of each pulse received, and comparison of pulse OBA with reference OBA. Multiple decoders are necessary as one may be busy during the presence of a second bracket and thus, a second decoder is additionally required. Up to four replies may be decoded at the same time with the decoders 16-19. The decoded data is stuffed into individual registers 21-24 for further evaluation and analysis by a reply correlator processor. The decoded data is used in the standard SSR systems for receiving altitude, identity, and other parameters encoded with the reply pulse train.

Illustrated in FIG. 3 is an off-bore-sight-azimuth (OBA) line connected to the phantom bracket detector 13. This data contains one 9 bit word, 8 bits of OBA and a receiver side lobe suppression (RSLS) bit, for each lead edge pulse in the video delay line device 11. As a principal means for distinguishing between phantom brackets and true brackets, the off-bore-sight azimuth channel provides direction indicating information with 0.022 degree resolution to identify the relative direction of each of the reply pulses which have been supplied to the leading edge generator 10. Thus, with the pulse azimuth position as a principal discriminant, it is possible to eliminate subsequent pulses as a potential F1 pulse of a later reply when the pulse has the same azimuth direction as the first F1 pulse received in the pulse train. Even though two pulses having the proper spacing may be detected by the bracket detector 12, subsequent to the initial F1, F2 pulses, if one of the code positions of the first reply has an off bore-sight direction which is the same as the initial F1 pulse, they belong to the same reply and cannot be an F1 pulse of a later reply and, no bracket detection will occur.

Figure 4:
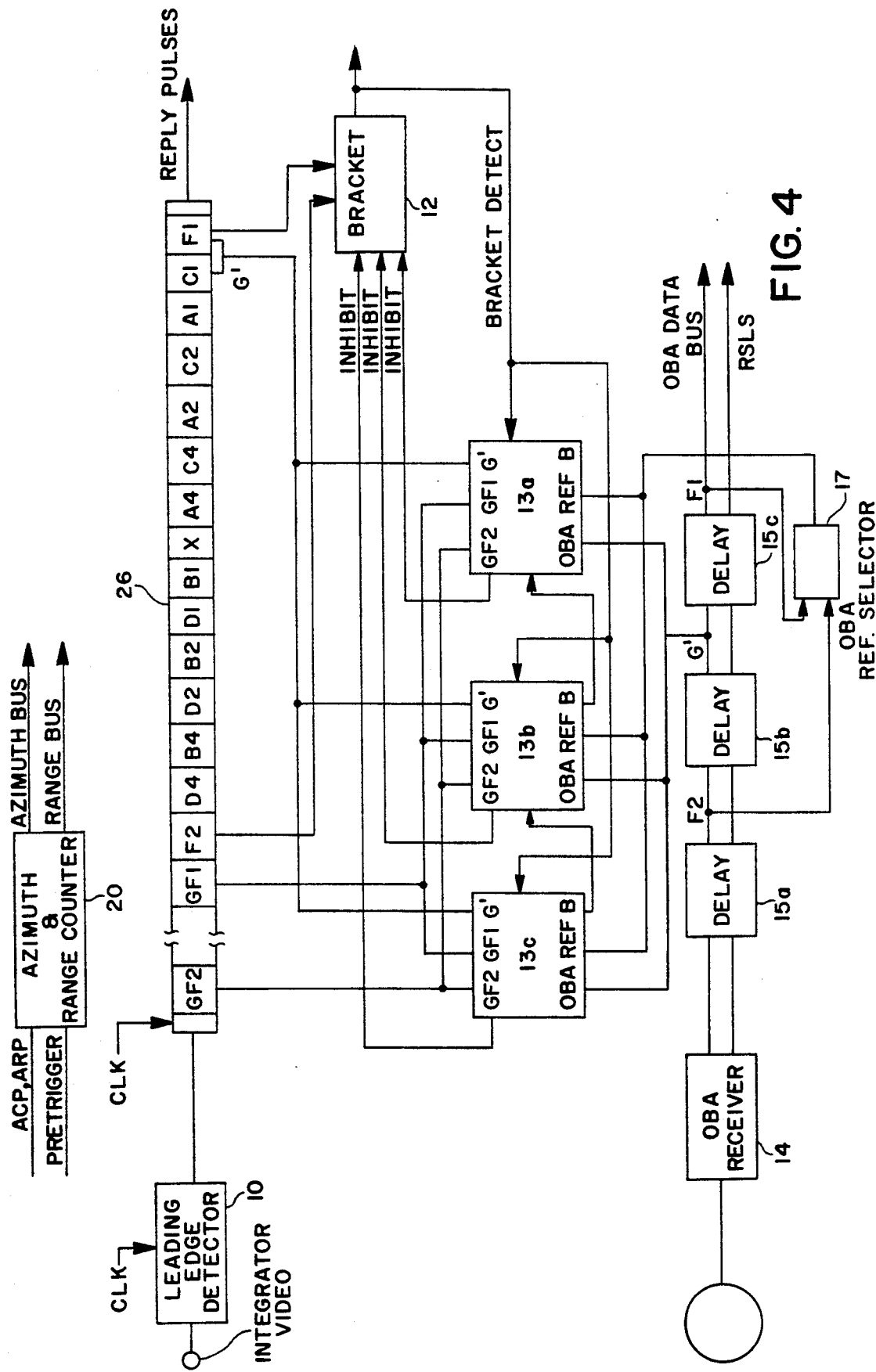
FIG. 4 is a detailed view of the bracket detection and phantom bracket detector used to process SSR replies in accordance with FIG. 3.

Referring now to FIG. 4, there is shown a mechanism for locating phantom bracket conditions occurring in garbled replies, as well as in closely-spaced replies being processed by the interrogator receiver. The interrogator video is processed and reduced to one nominal 60 nanosecond pulse representing the leading edge of the received pulse for a nominal received pulse width. In the situation wherein pulses are overlapped and are larger than the maximum allowed pulse width for one SSR pulse, pulse width discrimination is used to insert one or two additional lead edges at appropriate positions. The lead edge processing circuitry 10 operating at 16.552 MHz generates these leading edge pulses which are applied to a digital delay line device 26 operating at the same clock rate.

The digital delay line device 26 stores the leading edge pulse train and provides five taps for processing purposes. As shown in FIG. 4, two of these five taps are the F1 and F2 position taps. The last position in the digital delay line corresponds to the first pulse received, i.e., the F1 framing pulse of a received reply. The remaining pulse positions can be identified from FIGS. 1 and 2 as standard code pulse positions for a reply, although they are not available on taps of the delay line. The F2 pulse position and F1 pulse position are connected to a bracket detector 12 which will identify the coincidence of these two pulses having the required spacing of 20.3 microseconds including tolerances, thus constituting framing pulses for a reply.

The remaining three taps in the delay line device 26 provide a look-ahead feature such that a garbling reply or a second closely-spaced reply, likely to produce phantom replies with the first reply detected by bracket detector 12 can be detected. When a phantom condition exists due to overlapping or garbling replies, the bracket detection of the phantom brackets can be inhibited, thus avoiding the indication of a phantom reply.

With the high clock rate, it is possible to have up to two replies interleaved with the first reply detected by the bracket detector 12. For this reason, three phantom bracket detectors 13a, 13b and 13c are provided to look at three individual interleaved positions to identify the phantom replies and inhibit bracket detection of these replies. The three phantom bracket detectors are independent and are interconnected in such fashion that the second is enabled only if the first is in the process of searching for phantom bracket pulses, and the third is enabled only if the second is in the process of searching for phantom bracket pulses.

Three look-ahead taps in the digital delay line 26 are shown and defined as G', GF1 and GF2. Tap G' is positioned timewise between the F1 and C1 position of the delay line. One bracket width away from the G' tap is the GF1 tap. Further, a third tap GF2 is located yet another bracket width away from the GF1 tap, permitting the look-ahead feature to be extended out two bracket periods.

The off-bore-sight data received from the monopulse interrogator receiver 14 is converted into a digital 8 bit data signal identifying the off-bore-sight azimuth position of each video pulse received. The OBA data is delayed in three different delay sections, 15a, 15b and 15c. The OBA delay 15c provides OBA data of the video pulse appearing at the G' tap on the video line. Thus, each of the phantom bracket detectors 13a, 13b and 13c will be accorded OBA positional data to determine whether or not a pulse appearing at G' originates from an azimuth different from a reference azimuth.

The reference azimuth is also taken either from the output of OBA delay element 15c corresponding to the OBA at the position of the F1 pulse, or the output of OBA delay element 15a corresponding to the OBA at the position of the F2 pulse through OBA reference selector 17. Positional data is used as a discriminate in making decisions as to whether or not pulses having the spacing of an SSR reply framing pulse pair belong to a different reply.

Also shown in FIG. 4 is the azimuth and range counter 20 which is used to store azimuth position data identifying the bore-sight position of the antenna, and the range of the aircraft issuing the reply. The azimuth data and range data are used in decoding of the replies, as is evident in FIG. 8.

Having thus stored the events constituting a reply, a garbling reply and/or a closely-spaced reply, it is possible to make decisions as to whether or not pulse pairs constitute a phantom bracket and to take appropriate action.

Figure 5:
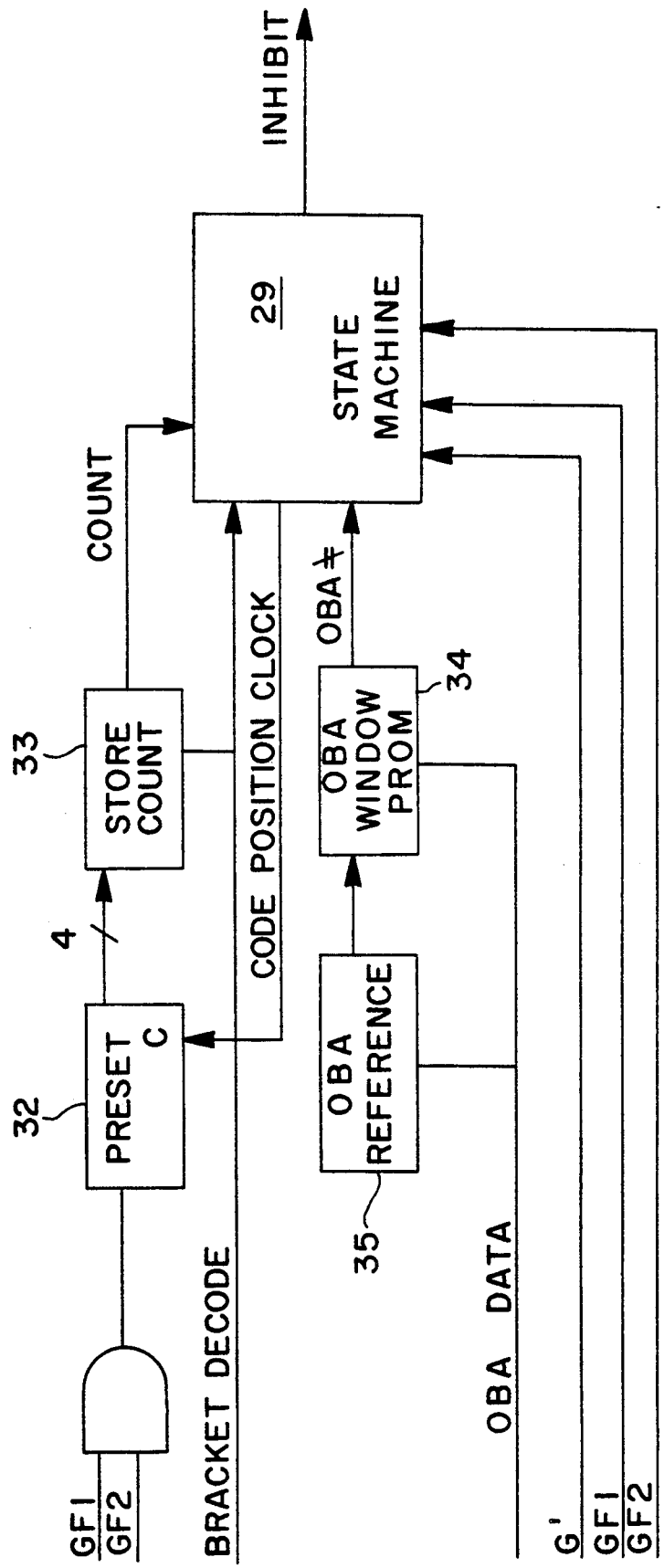
FIG. 5 illustrates the phantom bracket detector in greater detail.

FIG. 5 illustrates the details of one of the phantom bracket detectors. Referring now to FIG. 5, there is shown a state machine 29 which takes note of the following four (4) signals: OBA ≠, G', GF1, GF2.

The OBA ≠ is a determinate as to whether or not the OBA data at position G' lies within the OBA window. The OBA window is generated in PROM 34 which uses as its reference input the OBA reference data from register 35 corresponding to the off-bore-sight azimuth position of the F1 or F2 pulse.

The state machine 29 makes decisions based on the following tables as to whether or not pulses, having the spacing of two framing pulses F1 and F2, constitute a valid reply or phantom reply. In the event a phantom bracket is detected, an INHIBIT signal is generated for the bracket detector 12 such that the phantom bracket pulses do not result in a true bracket decode being made by the bracket detector 12, thus incurring the problems associated with a phantom reply detection.

Using the look-ahead features provided by the delay line 26, the following conditions can occur on G', OBA≠, GF1, GF2 as shown in Table 1.

TABLE 1

| # | G' | OBA Condition | GF1 | GF2 | Result | Inhibit |
|---|----|---|-----|-----|--------|---------|
| 1 | 0 | equal | 0 | 0 | no action | No |
| 2 | 0 | not equal | 0 | 0 | no action | No |
| 3 | 0 | equal | 0 | 1 | no action | No |
| 4 | 0 | not equal | 0 | 1 | no action | No |
| 5 | 0 | equal | 1 | 0 | indicate garble condition | Yes |
| 6 | 0 | not equal | 1 | 0 | indicate garble condition | Yes |
| 7 | 0 | equal | 1 | 1 | indicate closely spaced replies | Yes |
| 8 | 0 | not equal | 1 | 1 | indicate closely spaced replies | Yes |
| 9 | 1 | equal | 0 | 0 | code pulse from reply 1 | No |
| 10 | 1 | not equal | 0 | 0 | OBA process invalid | No |
| 11 | 1 | equal | 0 | 1 | code pulse from reply 1 no action | No |
| 12 | 1 | not equal | 0 | 1 | OBA process invalid | — |
| 13 | 1 | equal | 1 | 1 | garble condition | Yes |
| 14 | 1 | not equal | 1 | 0 | garbling reply | No |
| 15 | 1 | equal | 1 | 1 | closely spaced reply | Yes |
| 16 | 1 | not equal | 1 | 1 | garble reply | No |

1 = pulse present
0 = no pulse present.

Conditions 1 through 4 indicate a set of conditions in which there is no garbling reply or closely-spaced reply requiring action. Conditions 5 and 6 indicate a garbled condition occurring subsequent to the bracket decode of the first received reply. In conditions 5 and 6, there has been found following the first bracket decode a pulse at GF1 which follows the first reply indicating the presence of a second reply, but not identifying the frame pulses associated with the second reply. The difference between the two conditions is whether the OBA data equals the OBA references. These represent garble conditions which will be subsequently monitored to determine where the garbling reply begins and ends such that only the garbling reply and no phantom replies are permitted to generate a bracket detection when the code pulse sets reach bracket detector 12 taps F1, F2 on the delay line.

Conditions 7 and 8 indicate two closely-spaced replies. This results as GF1 and GF2 are indicative of a pair of pulses spaced at the framing interval of a reply, following the F2 of the first bracket detection of the first reply. Conditions 9 and 11 are indicative that a code pulse from the first reply has reached G' as the G' tap produces a pulse having an OBA the same as the reference OBA. Conditions 10 and 12 represent a situation wherein the OBA process is invalid, and resort will be made to the counters 32 and register 33 to determine the location of the garbling reply in delay line 26. The garble condition is also detected in condition 13, wherein G' has a pulse at the same time GF1 has a pulse. The G' pulse also has an OBA position which is apparently the same as the first reply, and therefore represents a code pulse of the first reply.

The actual garbling reply is detected in condition 14. In this circumstance, a pulse on G' has a different OBA than the first reply processed, and further contains a pulse at GF1, thereby constituting an F2 pulse of a reply having an F1 pulse on the G' tap. By looking behind the first reply F2 position, it is possible to locate the end of the second garbling reply. Condition 14 therefore calls for a release of the inhibit on bracket detector 12, permitting the found reply to be bracket decoded.

Condition 15 is a closely-spaced reply as GF1 and GF2 both have pulses spaced in accordance with the framing pulse spacing of an SSR reply. The closely-spaced reply may then be processed by treating every pulse ahead of GF1 as belonging to the first reply, and inhibiting bracket decodes until the first reply has passed through the delay line 26.

Condition 16 is a special circumstance, wherein more than one garbling or closely spaced replies are detected along with the first reply received by delay line 26. The pulse located in position G' that has an OBA that does not match the reference OBA, in conjunction with the pulse located in the GF1 tap, indicates that a garbling reply has been located. Additionally, the pulse that resides in tap GF2 indicates that a third reply is present. Condition 16 therefore requires that the inhibit be released on the bracket detector 12.

Figure 6:
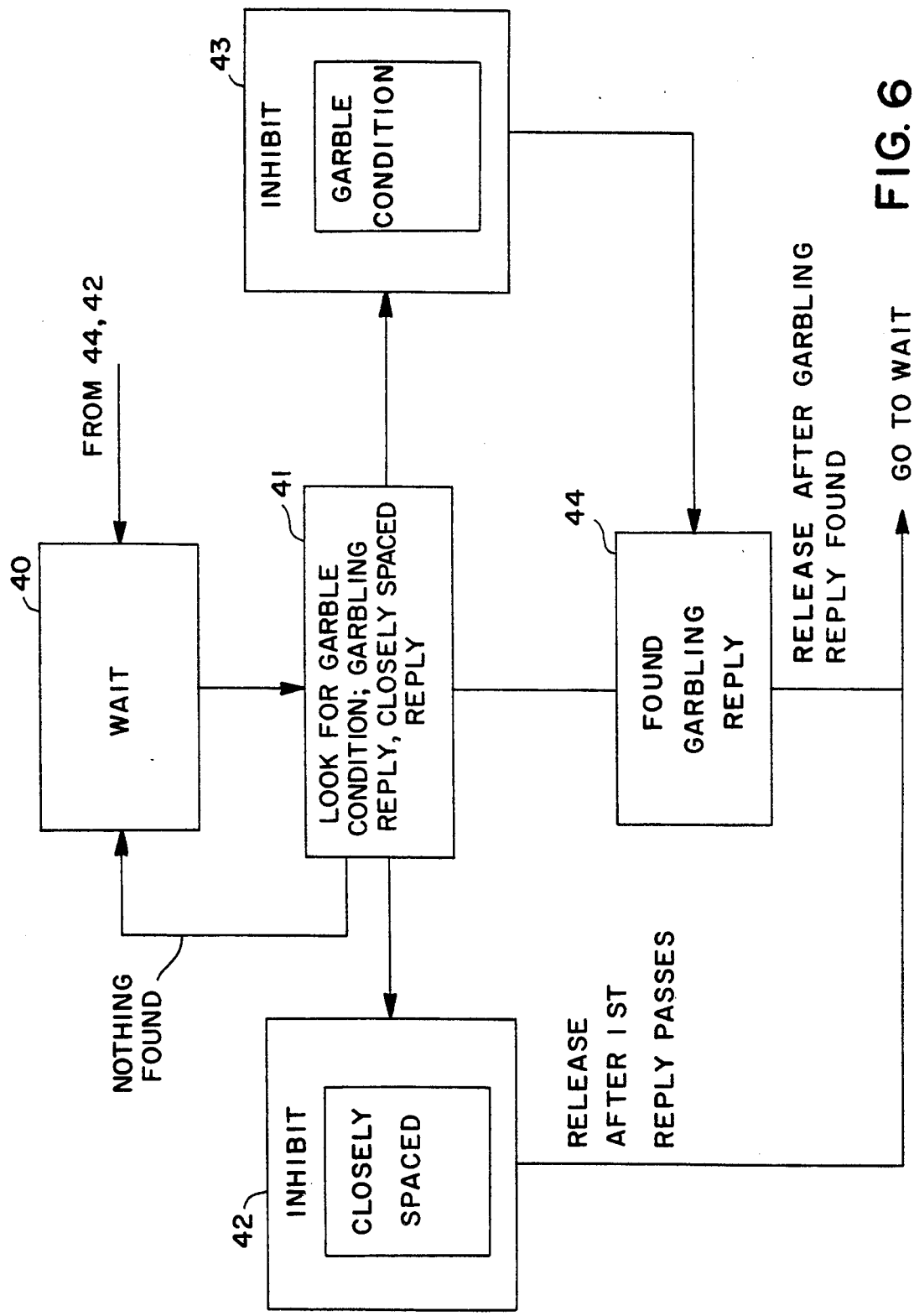
FIG. 6 illustrates the operation of the state machine of the phantom bracket detector of FIG. 5.

Before describing the default circuitry for determining where a garbling reply begins and ends when conditions 10 and 12 are observed, the operation of one of the phantom channel detectors will be described with respect to the state diagram of FIG. 6. The remaining two phantom channel detectors operate in the same manner, but at the two interleaved positions for the first reply.

The state 40 represents the condition before a first bracket decode occurs. At the time a first bracket decode occurs, the state machine 29 will begin to search for a garble or closely-spaced condition. The state machine accomplishes this by examining all of the first replies synchronous code positions as they pass through the G' tap in the delay line, as well as the data available from the GF1, GF2, and OBA≠ taps at the same synchronous time. Using the data available in these taps in conjunction with the aforementioned table, the state machine looks at each synchronous position until one of the following conditions is found: (1) a garble condition, (2) a garbling rely, or (3) a closely-spaced reply. When a garbled condition has been found, the bracket detector 12 is inhibited in step 43 from making any further bracket decodes until the garbling reply has been located, at which time the bracket detector will be released so that it can detect the garbling reply which follows the first reply. In this way, garbling replies are allowed to be detected and decoded in a subsequent decoder. If the garbling reply is found before an indication of a garble condition, no inhibiting is done and the garbling reply is allowed to be detected and decoded by state 44.

When the closely-spaced condition is detected in state 42, the bracket detector is inhibited until after the first reply has passed through the delay line. This corresponds to the F2 pulse reaching the F1 pulse position. Thus, in a closely-spaced reply condition, bracket detection will be inhibited for the framing period of the the first bracket detection.

Now that the garbling or closely-spaced reply has been permitted to be detected and processed, the machine goes back to the wait state 40 for the next bracket detection.

Having thus generally described what happens when each of the foregoing conditions are detected, the default circuitry of FIG. 5 will be disclosed. In those ambiguous circumstances represented either by conditions 10 or 12 of Table 1, or when a garble condition is found but the garbling reply cannot be found by use of the OBA data, resort will be made to the internal state machine counter 32 and associated state machine count storage register 33. The counter 32 is preset to 15 when GF1 and GF2 each produce pulses which are coincident in time, indicating a framing period. At each subsequent synchronous pulse position, the counter decrements when no bracket appears at the taps GF1, GF2 or presets the counter again to 15 if a bracket does appear at the taps GF1, GF2. At the time of the first bracket decode, the count will be transferred to the count register 33. This count identifies the last possible position of an F1 pulse of a second garbling reply in the video delay line 26. Thus, this count will determine when to release the inhibit command on the bracket detector 12, which occurs when the located F1 pulse reaches the F1 position of the delay line. The stored count represents the synchronous code pulse differential between the two garbling replies. Thus, this default circuitry will identify where the subsequent reply occurs and ends so that the INHIBIT may be removed from the bracket decoder just as the subsequent reply enters the F1 and F2 positions of the delay line 26.

Figure 7:
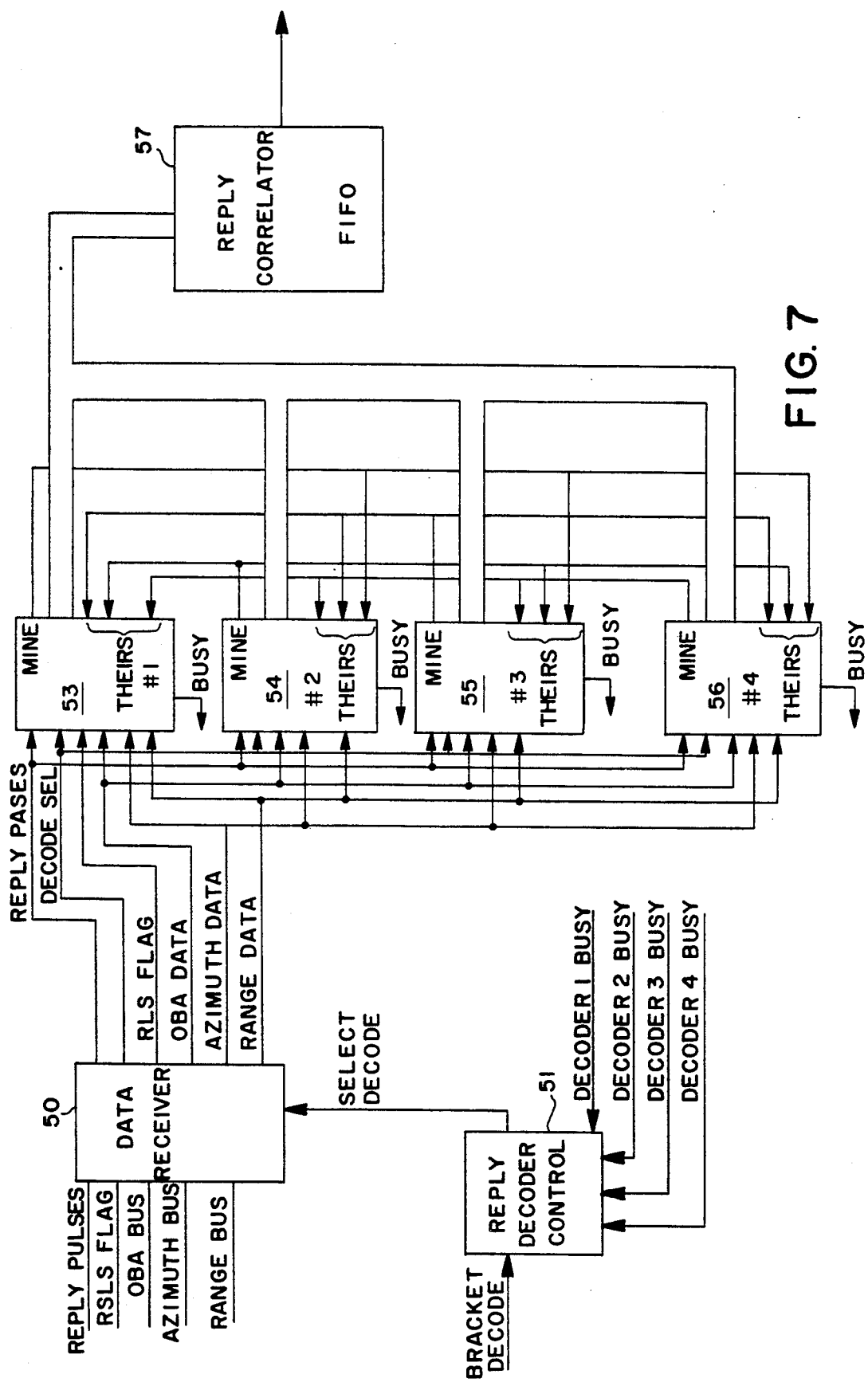
FIG. 7 illustrates in greater detail the decoder which is used to decode each bracket of reply pulses identified by the bracket decoder.

Having thus described how phantom replies are eliminated during bracket decode such that only actual replies bearing data for decoding are produced, reference may now be made to FIG. 7, illustrating the process for decoding replies so identified.

A data receiver 50 is shown which receives the video pulses from the delay line 26, as well as other information used in the decoding process. An RSLS flag input is provided along with the OBA data, identifying whether or not a particular video pulse being received is found to be in the main lobe or side lobe. The OBA data bus, identifying the off-bore-sight azimuth position of each video pulse being received by the receiver within 50, is also applied to a register residing in 50 for use by the decoders 53 through 56. An azimuth bus provides data generated from the received antenna pointing position and provides the current antenna azimuth position. The antenna azimuth position and off-bore-sight azimuth are combined arithmetically to form a reply absolute azimuth. A range bus is also provided identifying the range of all pulses received.

A reply decoder control module 51 will assign one of the four decoders 53 through 56 to process a reply stream of video pulses. The reply decoder control module 51 receives an indication from each of the decoders 53 through 56 to identify the availability of the next decoder for processing the reply stream of video pulses.

Each of the decoders 53, 54, 55 and 56 will produce a parallel multi-bit target code, multibit target code confidence, identifying the confidence of each bit of the target code, target range and target azimuth. When a reply decoder has completed decoding a reply, a reply correlator 57 is informed of the pending data. Data transfer is then orchestrated by the reply correlator 57 which transfers the target code, confidence, range and azimuth into a FIFO for further evaluation and processing.

Figure 8:
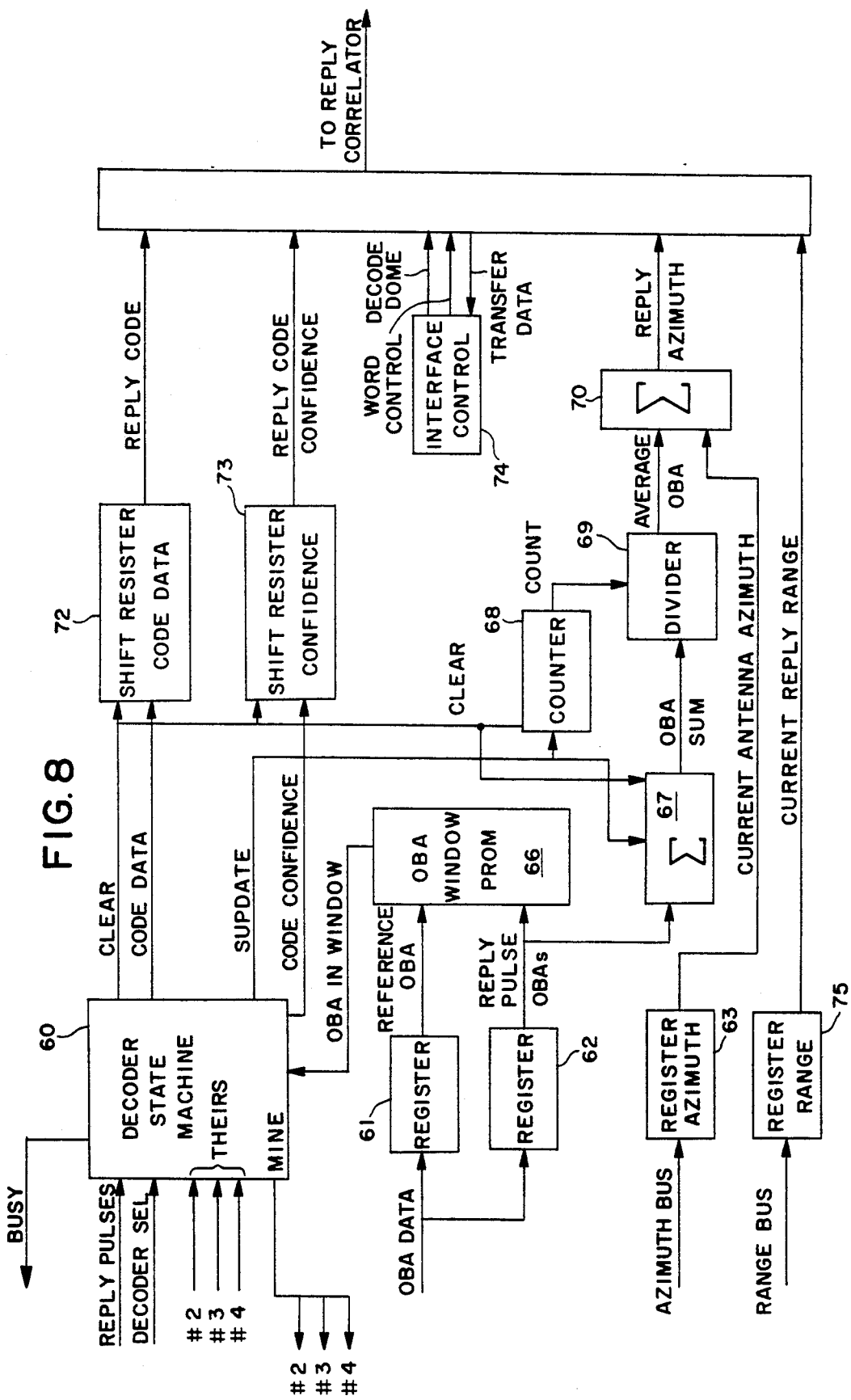
FIG. 8 illustrates the individual decoders for providing the reply data and related confidence data to an air traffic control computer.

FIG. 8 illustrates the decoder 53 which is identical in all respects to the remaining decoders 54, 55 and 56. The decoder includes a decoder state machine 60 which will receive the video signal information, as well as inputs from each of the remaining decoders identified as numbers 2, 3 and 4. Further, the decoder state machine receives a signal indicating whether or not a particular video pulse received lies within the OBA window of the previously received reference framing pulse, and an RSLS flag to determine the confidence level of each code pulse of a bracket position.

The decoder state machine 60 operates in conjunction with the decoder state machines of the remaining decoders 54, 55 and 56. During the evaluation of each video pulse, when decoders 54, 55 or 56 indicates that that pulse lies within the OBA of a reply in which it is processing, this fact will be stated to the remaining decoder state machines. Thus, each decoder state machine receives from the remaining decoder state machines of other decoders 54, 55 and 56 an indication whether or not a particular video pulse is being claimed by another decoder. Therefore, an indication is given by each decoder state machine to the remaining decoder state machines identifying that a particular pulse belongs to a reply it is processing.

The OBA information supplied to the decoder state machine is produced by the OBA window PROM 66. When a reply decoder is started by decoder controller 51, a reference OBA selected from either the F1 or F2 frame pulse is selected by the phantom elimination channels and is locked into register 61, and provided to the OBA window PROM 66 as a reference OBA position. Subsequent OBA data corresponding to each video pulse in a reply is successively stored in register 62. Register 62 will then provide information to be compared with the previous reference OBA information to determine whether or not each succeeding video pulse has an OBA lying within a defined window. OBA data not within this window is presumed to be from a different reply or fruit, unrelated to the reply being processed by that decoder.

The decoder includes circuitry comprising an adder 67, counter 68, divider 69, adder 70 and bore-sight register 63 which will be used to calculate the azimuth of the reply being processed. The azimuth bore-sight register 63 latches the current antenna bore-sight azimuth, generated by the azimuth counters, at the time the decoder starts a new reply. Each time a synchronous position's OBA data, received from the OBA data bus, lies within the OBA window, a sum update clock signal is provided to the adder and counter 68. The adder 67 will add, with this clock pulse, the most recent OBA data with previously received and summed OBA data also lying within the window. A counter 68 counts the number of pulses within the OBA window, and the divider 69 average this OBA sum such that the average OBA, lying within the window, may be provided to the adder 70. Adder 70 calculates the reply absolute azimuth by adding the reply's average OBA to the current antenna bore-sight azimuth stored in register 63.

The decoder state machine 60 has various signal inputs depicted in Table 2 to determine what are the reply's code data, and code confidence level. Referring now to Table 2, each code value and confidence determination level is shown for the various conditions on the decoder state machine. As can be seen, both the code and confidence level depend upon the video pulse state for each video pulse position in a reply, its respective OBA value, i.e., is in or out of the window, the RSLS flag value, i.e., is the OBA data from a side lobe or a main lobe, and the state of other decoders which may indicate that this pulse belongs to a reply they are processing. Based on this information, the shift register code data 72 is assembled for each video pulse position in a reply code. Along with this code data, a confidence level is stored in shift register 73. Thus, each decoded reply bit has associated therewith a target confidence bit which can be interpreted and integrated in the reply correlation device (not shown).

TABLE 2

| CODE VALUE AND CONFIDENCE DETERMINATION | | | | |
|---|---|---|---|---|
| Video | OBA Condition | RSLS | Other Decoder Claim | Code | Code Conf |
| 0 | not equal | 0 | 0 | 0 | 1 |
| 0 | not equal | 0 | 1 | 0 | 1 |
| 0 | not equal | 1 | 0 | 0 | 1 |
| 0 | not equal | 1 | 1 | 0 | 1 |
| 0 | equal | 0 | 0 | 0 | 1 |
| 0 | equal | 0 | 1 | 0 | 1 |
| 0 | equal | 1 | 0 | 0 | 1 |
| 0 | equal | 1 | 1 | 0 | 1 |
| 1 | not equal | 0 | 0 | 0 | 0 |
| 1 | not equal | 0 | 1 | 1 | 0 |
| 1 | not equal | 1 | 0 | 0 | 0 |
| 1 | not equal | 1 | 1 | 1 | 0 |
| 1 | equal | 0 | 0 | 1 | 0 |
| 1 | equal | 0 | 1 | 1 | 1 |
| 1 | equal | 1 | 0 | 1 | 0 |
| 1 | equal | 1 | 1 | 1 | 0 |

VIDEO PRESENT = 1
VIDEO NOT PRESENT = 0
VIDEO IS MARKED AS RSLS = 1
VIDEO IS NOT MARKED AS RSLS = 0
OTHER DECODER CLAIMS PULSE AS PART OF ITS REPLY = 0
OTHER DECODER DOES NOT CLAIM PULSE AS PART OF ITS REPLY = 1

The contents of shift registers 72 and 73, azimuth adder 70 output and reply range register 75 are transferred to the reply correlator FIFO 57 upon local control by the interface control 74. At the time the reply is fully decoded, and the contents of the shift registers 72 and 73 are full, the interface control 74 will post a signal on the reply correlator bus, indicating this data is to be transferred. Control then commences in accordance with standard bus interface protocols, such that the words may be transferred and this transfer completion acknowledged back to the interface control.

At this time, the decoder state machine 60 will remove a busy bit applied to the reply decoder control 51, indicating that the decoder is now available for processing of subsequent replies.

It can be seen that the foregoing system avoids any phantom decodes, such that any one of the decoders will be operating on information which belongs to many different replies. Further, confidence level is built for each decode which may be later assessed and therefore improve the overall reliability of the reply processing.

Thus, there has been described with respect to a preferred embodiment a reply processor and decoder more particularly described by the claims which follow.

What is claimed is:

1. An SSR processor/decoder for separating pulse code replies in a series of replies comprising:
   a leading edge detector for receiving said series of replies and generating pulses representing the leading edge of each pulse in said replies;
   a delay line connected to receive said pulses representing said leading edge, said delay line having a plurality of taps corresponding to pulses having a known time position within a reply, first and second of said taps corresponding to first and second framing pulses representing the first and last pulses in a reply, a third tap representing a time position following said first framing pulse between a pair of consecutive pulses, and fourth and fifth taps which represent time positions subsequent to said first framing pulse, and which differ by the time interval between framing pulses;
   a bracket decoder connected to said first and second taps for determining the beginning and end of a reply;
   a phantom reply detector connected to said third, fourth and fifth taps for inhibiting said bracket decoder when two replies are represented by pulses in said delay line, one of said replies having a pulse spaced from a pulse of said other reply equal to the spacing of said framing pulses; and
   code pulses position decoder means for receiving said pulses from said delay line, and a signal from said bracket decoder, said code pulse position decoder providing data representing a single reply.

2. The SSR processor/decoder of claim 1 wherein said phantom reply detector receives an additional signal representing the direction of each reply pulse, and compares said direction of each reply pulse with a reference direction representing the direction of said first framing pulse to determine the identity of said two pulses from different replies.

3. The SSR processor/decoder of claim 2 wherein said third tap correspond to a time position following said first framing pulse an before a first code pulse position, and said fourth tap corresponds to a time position which differs with respect to said third tap by the time difference between said known framing pulses, and a fifth tap corresponding to a time difference with respect to said fourth tap corresponding to said known framing pulses time difference.

4. The SSR processor/decoder of claim 1 wherein said phantom reply detector includes a state machine which determines whether said two replies are overlapped, producing a garbled condition, or are closely spaced non-overlapping replies.

5. The SSR processor/decoder of claim 4 wherein said state machine identifies the framing pulse position of a later occurring closely spaced reply, and releases said bracket decoder inhibit when a first reply passes through said delay line.

6. The SSR processor/decoder of claim 4 wherein said state machine identifies said garble condition and releases said inhibit when a second later reply first framing pulse reaches said first tap.

7. A device for processing SSR transponder replies, which include a serial pulse stream identified by first and second framing pulses, said device establishing the beginning and end of overlapping and closely spaced replies comprising:
a leading edge detector for generating a pulse stream having pulses which occur synchronously with pulses of said serial data stream;
delay line for receiving said leading edge detector pulse stream, said delay line having a plurality of taps which can identify the presence or absence of pulses occurring in said pulse stream;
a bracket decoder connected to first and second of said taps for identifying said first and second framing pulses, whereby the beginning and end of a reply is detected; and,
a phantom reply detector connected to third, G', and fourth, GF1, remaining taps, and to a source of data identifying the position in azimuth of each of said code pulses corresponding to each of said leading edge pulses, said phantom reply detector inhibiting said bracket decoder when said third and fourth taps produce simultaneously occurring pulses, indicating the presence of a second overlapping reply, and releasing said inhibit when said third tap produces a pulse representing a corresponding code pulse having a different position in azimuth than a previously detected framing pulse.

8. The device of claim 7, wherein said phantom reply detector includes a fifth, GF2, remaining tap, said fifth remaining tap and said fourth remaining tap indicating the presence of two closely-spaced non-overlapping replies, said phantom reply detector inhibiting said bracket decoder until said leading edge pulses corresponding to first and second framing pulses of an earlier reply exit said delay line.

9. The system of claim 8 further comprising a decoder means for receiving reply pulses from said delay line which occur between framing pulses identified by said bracket decoder, said decoder receiving said source of data for indicating said azimuth position of each of said reply pulses and comparing said position with a reference position of a framing pulse belonging to said reply pulses, said decoder providing a confidence level indication of each reply pulse based on said azimuth data.

10. The system of claim 9 further comprising:
means for summing each pulse azimuth position which lies within a window azimuth position; and,
means for computing an average azimuth position from said sum.

11. A device for processing and decoding SSR transponder replies comprising:
a delay line for storing at least two transponder replies;
a bracket detector connected to said delay line for indicating the presence of framing pulses spaced apart a framing time interval;
a data bus supplying position data identifying the relative azimuth direction of each pulse of said transponder replies;
a decoder connected to said bracket detector, data bus and delay line, said decoder including:
an azimuth position window memory for receiving reference azimuth data and defining a range of positions;
means for determining when a pulse has been received which lies within said range of positions; and,
means for generating a confidence indication for each pulse based on whether or not said pulse lies within said rang of positions.

12. The device for processing and decoding of claim 11 further comprising means for forming an average of the azimuth positions which lie within said range.

13. The device for processing and decoding of claim 12 further comprising means for updating a transponder position with said average position.

14. A device for processing SSR transponder replies which include a serial pulse stream identified by first and second framing pulses, said device establishing the beginning and end of overlapping and closely spaced relies comprising:
a delay line for receiving a stream of pulses representing said serial pulse stream, said delay line having a plurality of taps which can identify the presence or absence of pulses within said data stream;
position determining means for providing data identifying the relative position of each pulse passing through said delay line with respect to a reference position;
a bracket decoder connected to said delay line for detecting first and second pulses in said delay line spaced in time equal to the spacing of said framing pulses; and,
a phantom reply detector connected to said taps and said position determining means, said phantom reply detector determining from the relative position of pulses in said delay line and said data identifying the relative position of each pulse the presence of overlapping and adjacent replies, said phantom reply detector supplying an inhibit signal to said bracket decoder to prevent detection of a phantom reply identified by a pair of pulses from different relies having the spacing of two framing pulses.

15. The device of claim 14 wherein said position determining means establishes a reference position equal to 16. The device of claim 14 wherein said phantom reply detector is connected to a tap for sensing a pulse which occurs between the first framing pulse of a reply and the next adjacent pulse position in said reply.

17. The device of claim 16 wherein said phantom reply detector is connected to two additional taps for sensing a pulse which occurs one framing period and two framing periods, respectively, from said pulse which occurs between the first framing pulse and said next adjacent position.

* * * * *